Nov. 21, 1961 V. B. KWAST 3,010,066

FREQUENCY SENSITIVE CIRCUIT

Filed June 11, 1959

VICTOR B. KWAST
INVENTOR.

BY Rudolph J. Juick
ATTORNEY

United States Patent Office 3,010,066

Patented Nov. 21, 1961

3,010,066

FREQUENCY SENSITIVE CIRCUIT

Victor B. Kwast, Union, N.J., assignor to Daystrom Incorporated, Murray Hill, N.J., a corporation of New Jersey Filed June 11, 1959, Ser. No. 819,773
8 Claims. (Cl. 324—70)

This invention relates to a frequency sensitive circuit and more particularly to a parallel resonant circuit incorporating a diode ring modulator network therein, which circuit provides a D.-C. output current having a direction and magnitude dependent upon the frequency of the input signal thereto, over a narrow range of input signal frequency.

As will be readily apparent to those skilled in this art, a circuit which provides a direct current output dependent as to both direction and magnitude upon the frequency of an input signal thereto has a myriad of potential uses and applications in the electrical and electronic arts. Included among the uses, by way of example, are:

(1) A null detector in impedance bridges and other devices,
(2) A frequency (wave length) indicator,
(3) A capacitance and/or inductance meter,
(4) A Q-meter,
(5) A phase meter, and
(6) A frequency modulation detector (discriminator).

For purposes of description, but not by way of limitation, the circuit of my invention described hereinbelow is employed in an elecetrical tachometer arrangement having a very narrow speed range measurement. The tachometer includes a tachometer generator which provides an alternating current input to my novel circuit, the frequency of the generator output being a direct function of the rate at which the generator is rotated. The inductance and capacitance of the resonant tank circuit within my novel network defines and responds to a resonant frequency, while the modulator bridge arrangement therein, provides means for deriving a D.-C. output which varies either direction from zero in accordance as the generator output varies from the resonant frequency of the parallel L-C network. For a visual indication of the generator speed, a D.-C. instrument is employed in the modulator output circuit.

It is basic knowledge that in a high-Q parallel resonant tank circuit, the rate of change in the phase of the current therethrough with respect to the potential applied to the tank circuit is a maximum at the resonant frequency. In the circuit of my invention, this phase-shifting property of the parallel resonant tank circuit is utilized for maximum sensitivity in the frequency measurement of the input signal thereto. When utilized in a tachometer arrangement, the novel circuit provides means accurately measuring the generator speed which produces the resonant condition in the tank circuit, and speeds over a very narrow range about such resonant producing speed to about ±1 to 2% thereof. The circuit is stable and very easily adjusted.

An object of this invention is the provision of a novel frequency sensitive circuit comprising a shunt-connected inductor and capacitor which incorporates therein a modulator bridge, and which circuit acts as a null detector at the resonant frequency of the said inductor and capacitor.

An object of this invention is the provision of a null-indicating circuit employing a modulator bridge in which the signal current is connected to the bridge through a resonant tank circuit and the switching current is supplied thereto by the circulating current of the said tank circuit.

An object of this invention is the provision of a circuit for the detection of the resonance condition of a shunt tank circuit which tank circuit includes therein a modulator bridge supplied with switching current by the tank circulating current and with signal current by the current through the said tank circuit.

An object of this invention is the provision of a rugged and efficient tachometer having a high sensitivity and which may be produced at low cost.

These and other objects and advantages will become apparent from the following description when taken with the accompanying drawings, which drawings are for purposes of illustration and are not to be construed as defining the scope or limits of the invention, reference being had for the latter purpose to the appended claims.

In the drawings wherein like reference characters denote like parts in the several views.

Figure 1:
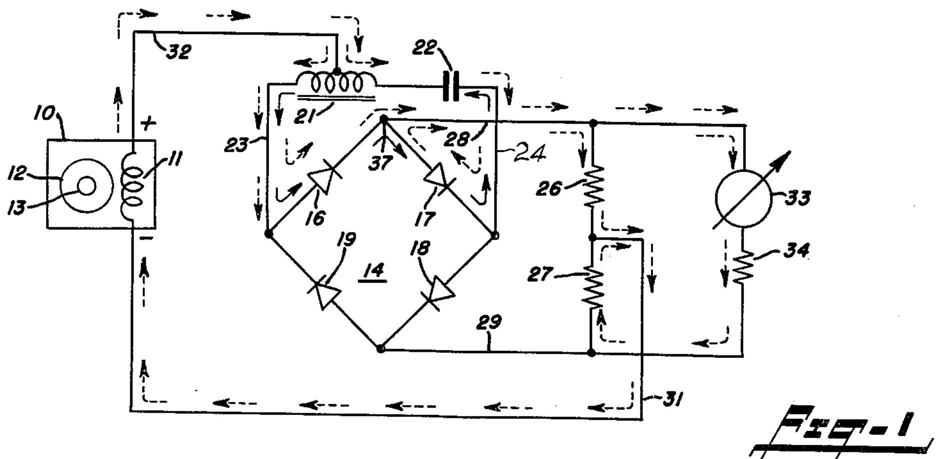
FIGURE 1 is a schematic circuit diagram of my novel null detector circuit employed in a tachometer arrangement and including markings showing switching and signal current paths at a given instant of the operating cycle.

Reference is first made to FIGURE 1 of the drawings wherein the reference numeral 10 designates a tachometer generator having a generator winding 11. The generator may be of the permanent magnet type comprising a stator having a winding (or plurality of connected windings) and a permanent magnet rotor 12 charged to a number of poles. The frequency of the generator output signal is, obviously, directly related to the rate of rotation of the generator shaft 13. The generator 10 is preferably of the type having a constant voltage output over the narrow frequency range the tachometer circuit is adapted to measure.

The novel frequency sensitive circuit of my invention includes a rectifier modulator bridge 14 comprising four rectifier elements 16, 17, 18 and 19 sensed in the same direction going around the bridge. For ruggedness and reliability, the rectifier elements are preferably of the semi-conductor type, such as germanium rectifiers, although they may be of the vacuum tube type. The modulator bridge functions as a polarized rectifier in my novel circuit. The circuit includes also a parallel resonant tank circuit comprising an inductor 21 and a capacitor 22. The inductor is preferably of the single winding type and may include an intermediate tap thereon. One end of the inductor and capacitor are connected together while the other ends thereof are connected across one conjugate diagonal arm of the modulator bridge through the leads 23 and 24.

A pair of series connected resistors 26 and 27 are connected across the other conjugate diagonal arm of the modulator bridge through the leads 28 and 29. The alternating current tachometer generator output is connected through lead wires 31 and 32 to the junction between the series connected resistors 26 and 27 and to the tap on the inductor 21, respectively. The other conjugate diagonal arm is connected also to a series connected D.-C. instrument 33 and resistor 34; the meter 33 providing a visual indication of the rate of rotation of the tachometer generator 10. Since the rectifier modulator bridge circuit 14 is not a ratio-system and, consequently, is voltage-dependent directly as the instrument deflection varies from the balance frequency position, the tachometer is accurate when the tachometer generator voltage output is relatively constant. In practice, if the nominal speed to be measured by the tachometer is 5,000 R.P.M., for example, the tachometer circuit is adapted to precisely indicate such speed and may indicate also a narrow range of speed from 4900 to 5100 R.P.M., and by proper adjustment and/or selection of the circuit components a speed range of from 4950 to 5050 R.P.M. may be obtained, if desired, for use wherein the tachometer generator speed is maintained within that speed, or where the measurement of speeds outside the range is unnecessary. It will be understood that the nominal speed to be measured is not limited to 5,000 R.P.M. but may comprise substantially any speed at which the tachometer generator may operate.

The frequency at which zero current output is obtained from the modulator bridge 14 is determined, primarily, by the resonant frequency of the L-C network comprising the inductor 21 and capacitor 22 (as determined by the self-inductance of the inductor and the capacitance of the capacitor) whereby the nominal speed to be measured is primarily determined by such L-C network.

The operation of my above-described tachometer circuit will now be described. The mathematical analysis of the bridge network and associated circuitry is quite complex and is not presented here as the general operation of the apparatus can be explained from the known characteristics of the said modulator bridge and associated circuitry. In FIGURE 1 of the drawings, the current flow for one-half of operation is shown; and in the following description the values of the resistors 26 and 27 are identical. The "+" and "—" signs adjacent the tachometer generator 10 indicate the generator polarity at a given instant. The solid lines and arrows indicate the path and direction of the circulating current within the tank circuit and will be hereinafter referred to as the "switching current." The broken lines and arrows indicate the path and direction of the tachometer generator current flow through the L-C network and modulator bridge and will hereinafter be referred to as the "signal current." The switching current switches alternate pairs of rectifier elements in adjacent arms of the modulator bridge from conducting to non-conducting. In FIGURE 1, the two adjacent rectifier elements 16 and 17 are conducting at the indicated polarity of the switching current while the rectifier elements 18 and 19 are non-conducting. It will be seen that the switching current comprises the oscillatory, or circulating, current of the L-C network comprising the inductor 21 and capacitor 22 connected together through the two conducting diodes of the modulator bridge. It will be noted that none of the circulating, or switching, current flows in the D.-C. instrument 33, hence, there is no indication on the meter due to the action of the switching current.

Figure 2:
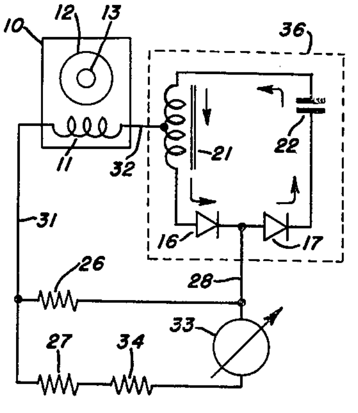
FIGURE 2 is a schematic circuit diagram of only the conducting elements included in the circuit at the same instant of the operating cycle of FIGURE 1.

Reference is made to FIGURE 2 wherein the diodes 18 and 19, which are non-conducting at the instant of the operating cycle illutrated in FIGURE 1, have been omitted from the circuit diagram. In FIGURE 2, the L-C network is designated by the reference numeral 36, and at the instant illustrated, includes the diodes 16 and 17. (It will be understood that one half cycle later, the L-C network includes the then conducting diodes 18 and 19.) It will be seen that the switching current designated by the solid lines and arrows, comprises the circulating current of the L-C network, and that the network includes only the inductor 21, capacitor 22, and the two conducting diodes of the modulator bridge. Since no additional resistors, or other circuit elements, are included in the parallel tank circuit, it will be apparent that the tank circuit may have a relatively high Q. It will be noted that energy for producing the circulating tank current is supplied thereto from the tachometer generator through the lead wires 28 and 32. By connecting the lead wire 32 to an intermediate tap on the inductor, advantage of the auto-transformer action of the inductor is obtained. It will be apparent, however, that the lead wire 32 may be connected to the junction between the inductor 21 and capacitor 22, if desired. Further, it will be apparent that the capacitor 22 may be replaced by a pair of series connected capacitors and the lead wire 32 connected to the junction therebetween.

Referring again to FIGURE 1, the low resistance path for the flow of signal current from the tachometer generator 10 includes the conducting rectifier elements 16 and 17, and the signal current path may be traced from the positive side of the generator through lead wire 32 to the intermediate tap on the inductor 21, whereat it may divide into two parallel paths, one path including the lead wire 23 and rectifier element 16 and the other path including the series connected capacitor 22, lead wire 24, and rectifier element 17. The currents recombine at the bridge terminal designated 37 and pass through the lead wire 28 from which it may again divide into two parallel paths; one path through the resistor 26, and the other through the series connected D.-C. instrument 33 and resistors 34 and 27. The currents recombine at the junction between the resistors 26 and 27 and pass through the lead wire 31 to the negative side of the tachometer generator.

The rectifier elements 18 and 19 are conductive one-half cycle later when the circulating, or oscillatory, tank circuit current changes direction. It will be apparent that the signal and switching currents (at, and adjacent, the resonant frequency of the L-C tank circuit) are of the same frequency since they are obtained from the same tachometer generator 10, therefore, the signal voltage reverses polarity simultaneously with the reference voltage.

Figure 3:
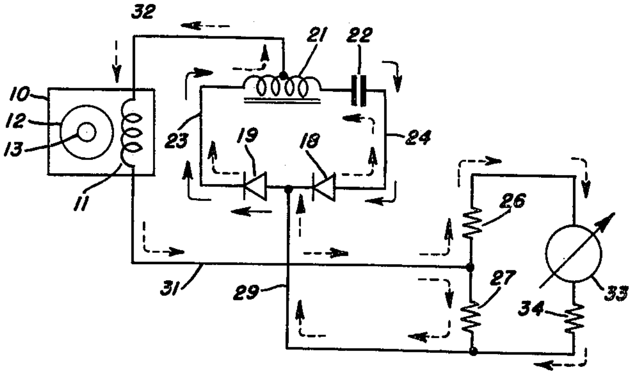
FIGURE 3 is a schematic circuit diagram of only the conducting elements of the circuit at a second instant of the operating cycle when the generator source is of opposite polarity.

Reference is made to FIGURE 3 wherein the conducting circuit elements for the above-described conditions are shown. Again, none of the circulating switching current in the tank circuit flows in the indicating instrument 33 and, further, the signal current flows in the same direction though the D.-C. instrument 33. Thus, a pulsating D.-C. current flows through the D.-C. instrument 33 so long as the polarity of the switching and signal currents change simultaneously.

The characteristics of the rectifier elements 16–19 should be the same among the rectifier elements. The exact magnitude of the instrument deflection or the relationship between the instrument and the alternating current components is not particularly important as the essential requirement is that the instrument provides a substantial deflection to indicate relatively small changes in the tachometer generator speed. The scale of the instrument is calibrated in terms of R.P.M. or other suitable markings.

At, and adjacent, the resonant frequency of the L-C network, the circulating current of the tank is larger than the generator current and, consequently, is also larger than the value of the signal current. The circulating current switches the appropriate rectifier elements from a conducting to a non-conducting state and vice versa whereby, in effect, during each one-half cycle the signal pulses of the same polarity flow alternately through resistors 26 and 27 producing two unidirectional pulses through the meter 33 during each cycle of operation.

One property of the modulator bridge is that if the polarity of either the signal or switching current flow is reversed, the direction of current flow through the meter 33 is also reversed. The phase-shifting property of the resonant tank circuit about the resonant frequency is utilized, in effect, to reverse the polarity of the signal current as the generator output signal passes through the resonant frequency to the tank. The D.-C. instrument is, therefore, preferably of the type wherein the normal zero position is at the center of the scale and calibrated whereby the nominal generator speed is indicated at mid-scale, and lower and higher speeds to either side of mid-scale.

A property of the modulator bridge which is essential to the function of the bridge for null-detection in the circuit of my invention is that only the in-phase component (or 180° out-of-phase component) of the signal current with respect to the switching current will be indicated on the D.-C. instrument 33, while the quadrature signal current component is not indicated on the instrument 33. At, and adjacent, the resonant frequency of the L-C network, the circulating current (which is the switching current is in quadrature phase relation with the tachometer generator voltage. The signal current, on the other hand, is in-phase with the generator voltage at the resonant frequency, therefore, at the resonant frequency of the L-C network, the switching current is at substantially a 90° phase relation with the signal current, and the D.-C. out-put of the modulator bridge is zero, whereby the D.-C. instrument remains at the normal zero center position.

Figure 4:
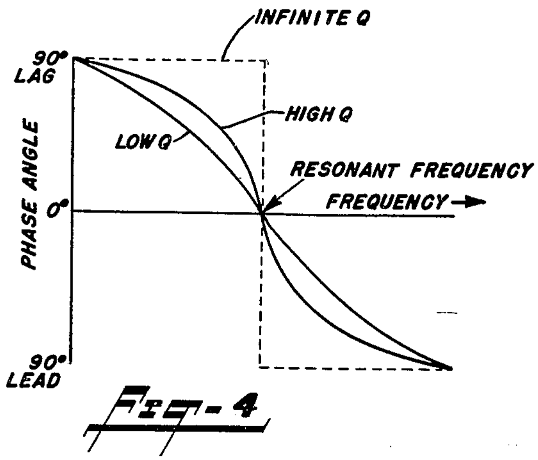
FIGURE 4 is a graph showing the change in phase of the current through a tank circuit as the frequency of the current source changes about the resonant frequency of such tank circuit.

Unlike the circulating current (i.e., the switching current) the signal current rapidly changes phase relation with the generator voltage as the generator frequency departs from the resonant frequency of the L-C network. A graph showing the phase relation between the generator current and voltage with frequency for parallel resonant circuits having different values of Q is shown in FIGURE 4. Referring to FIGURE 4, it will be noted that with a theoretical infinitely high Q tank circuit, the current therethrough lags by 90° when the frequency drops below the resonant frequency of the tank, and leads by 90° when the frequency rises above the resonant frequency. As the Q of the tank circuit becomes less, the curve becomes flatter. Since only a pair of diodes are included in the resonant tank in the circuit of my invention, the Q of the tank can be maintained at a relatively large value wherein the rate of change of the phase angle is large about the resonant frequency of the tank. It will be understood, then, that if the generator frequency output decreases from the resonant frequency, a large phase shift in signal current is produced wherey the signal current has large in-phase components with respect to the switching current, which is indicated by movement of the instrument 33 in one direction. Similarly, if the generator frequency output increases above the resonant frequency, a large phase shift in the opposite direction is produced in the signal current whereby the signal current has a large 180° out-of-phase component with respect to the switching current, which is indicated by movement of the instrument 33 in the other direction.

Since instrument deflection is dependent upon the phase-shifting properties of the tank circuit, and since the tank circuit is of relatively high Q wherein the maximum phase shift for a given predetermined change in frequency occurs at the resonant frequency of the tank, the resonance condition is defined with a maximum sharpness and sensitivity. Other advantages include the fact that the least loading on the source (the tachometer generator in the illustrated embodiment) obtains at the resonant frequency. Thus, if the novel circuit is used in a frequency measuring device, or the like, the least loading and subsequent detuning of the source circuit, occurs at the point of maximum sensitivity of the circuit. The circuit is stable since the resonant frequency is dependent upon the stable inductor and capacitor 21 and 22, respectively. Since the speed range of the tachometer generator is small, the change in the generator voltage output is likewise small and produces a substantially negligible effect on the meter indication. The efficiency of the circuit is high since the circuit operates about the resonance frequency of the tank circuit where the drain on the source is a minimum. The circuit will operate over an extremely wide range of resonant tank frequencies.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A frequency sensitive circuit comprising a modulator bridge, a resonant tank circuit including the said bridge, and means energizing the said tank circuit at the resonant frequency thereof, the current through the tank circuit supplying a signal current to the modulator bridge and the circulating current in the tank circuit supplying a switching current to the modulator bridge.

2. The invention as recited in claim 1 wherein the said means energizing the said tank circuit comprises a tachometer generator having a frequency output equal to the resonant frequency of the said tank circuit within the range of operation of the said generator.

3. A frequency sensitive tank circuit comprising a modulator bridge having rectifier elements sensed in the same direction going around the bridge, a resonant tank circuit including an inductor and capacitor, an alternating current energy source having an output frequency substantially equal to the resonant frequency of the tank circuit and energizing the said tank circuit, means connecting the inductor and capacitor across one set of opposed bridge junctions, a pair of series connected resistors connected across the other set of opposed bridge junctions, and means connecting the alternating current source to the inductor and to the junction between the said series connected resistors, switching current for the said bridge being supplied by the circulating current in the resonant tank circuit and signal current being supplied thereto by the current through the resonant tank circuit.

4. The invention as recited in claim 3 wherein the said alternating current energy source comprises a tachometer generator having a range of frequency output which includes the resonant frequency of the tank circuit.

5. The invention as recited in claim 4 and including a D.-C. indicating instrument connected to the other set of opposed junctions of the bridge.

6. A narrow speed range tachometer comprising a tachometer generator, a modulator bridge, a series connected capacitor and inductor connected across one set of opposed bridge junctions, a pair of series connected resistors connected across the other set of opposed bridge junctions, means connecting the tachometer generator to the inductor and junction between the said series connected resistors, a D.-C. instrument connected across the other set of opposed bridge junctions, the inductor and capacitor being parallel resonant at a frequency within the frequency range of the tachometer generator output, the circulating current through the inductor and capacitor providing a modulator bridge switching current, the current through the D.-C. instrument comprising the tachometer generator output current fed thereto through the said parallel resonant circuit.

7. A circuit adapted to measure frequency comprising a modulator bridge having rectifier elements sensed in the same direction going around the bridge, a tank circuit including an inductor and a capacitor arranged to resonate at a frequency determinable by the self-inductance of the inductor and the capacitance of the capacitor, an alternating current source for energizing said tank circuit, said tank circuit having connections to receive the signal being measured, switching current for the said bridge being supplied by the circulating current in the tank circuit.

8. A frequency sensitive circuit comprising a modulator bridge, a series connected capacitor and inductor having end taps and an intermediate tap connected across one set of opposed bridge junctions, a pair of series connected resistors connected across the other set of opposed bridge junctions, means connecting an alternating current input source across the intermediate tap on the inductor and the junction between the said series connected resistors, a D.-C. output circuit connected across the other set of opposed bridge junctions, the said capacitor having a value to resonate the self-inductance of the inductor at a predetermined frequency of the alternating current input source.

References Cited in the file of this patent

UNITED STATES PATENTS

| | | |
|---|---|---|
| 2,087,652 | Oakley | July 20, 1937 |

FOREIGN PATENTS

| | | |
|---|---|---|
| 690,158 | Great Britain | Apr. 15, 1953 |
| 871,031 | Germany | Mar. 19, 1953 |
| 727,434 | Great Britain | Mar. 30, 1955 |